United States Patent [19]
Mori

[11] 3,740,951
[45] June 26, 1973

[54] HYDROSTATIC POWER TRANSMISSION SYSTEM

[75] Inventor: Yoichi Mori, Yokohama, Japan

[73] Assignee: Nissan Motor Company, Limited, Yokohama, Japan

[22] Filed: Dec. 7, 1971

[21] Appl. No.: 205,634

[30]     Foreign Application Priority Data
   Dec. 28, 1970   Japan.............................. 45/119982
   Dec. 28, 1970   Japan.............................. 45/119983

[52] U.S. Cl....................... 60/465, 60/469, 60/487, 60/489
[51] Int. Cl. ...................... F16h 39/16, F16h 39/46
[58] Field of Search .................. 60/53 B, 53 R, 465, 60/469, 487, 489

[56]         References Cited
         UNITED STATES PATENTS
2,646,755  7/1953  Joy................................... 60/53 B X
3,237,398  3/1966  Croswhite ....................... 60/53 B X
         FOREIGN PATENTS OR APPLICATIONS
803,228  10/1958  Great Britain........................ 60/490

*Primary Examiner*—Edgar W. Geoghegan
*Attorney*—John Lezdey

[57]     ABSTRACT

Herein disclosed is a hydrostatic power transmission system of the split power path type having a constant fluid displacement unit as a pump unit driven by a driving member such as a transmission input shaft of a motor vehicle and a variable fluid displacement unit as a hydrostatic motor unit driven by the pump unit by means of fluid power and connected to a driven member such as a transmission output shaft of the motor vehicle. The two fluid displacement units are interconnected by a fluid circuit, which in the prior art transmission systems is opened to drain off the working fluid when the motor vehicle stops and closed to restore the fluid pressure in the fluid circuit when the motor vehicle is to start. A fluid pressure control mechanism is thus connected to the fluid displacement units so that the fluid pressure in the fluid circuit is automatically reduced to zero level when the vehicle is brought to a full stop and gradually increased from the zero level as the motor vehicle is started and driven at a low speed whereby the shocks otherwise resulting from the abrupt variation in the driving torque transmitted through the transmission system can be avoided. The transmission system is also provided with an arrangement adapted to interrupt the fluid path leading from the constant to the variable fluid displacement units during direct-drive condition in which fluid pulsation otherwise takes place in the latter unit to produce noises.

10 Claims, 5 Drawing Figures

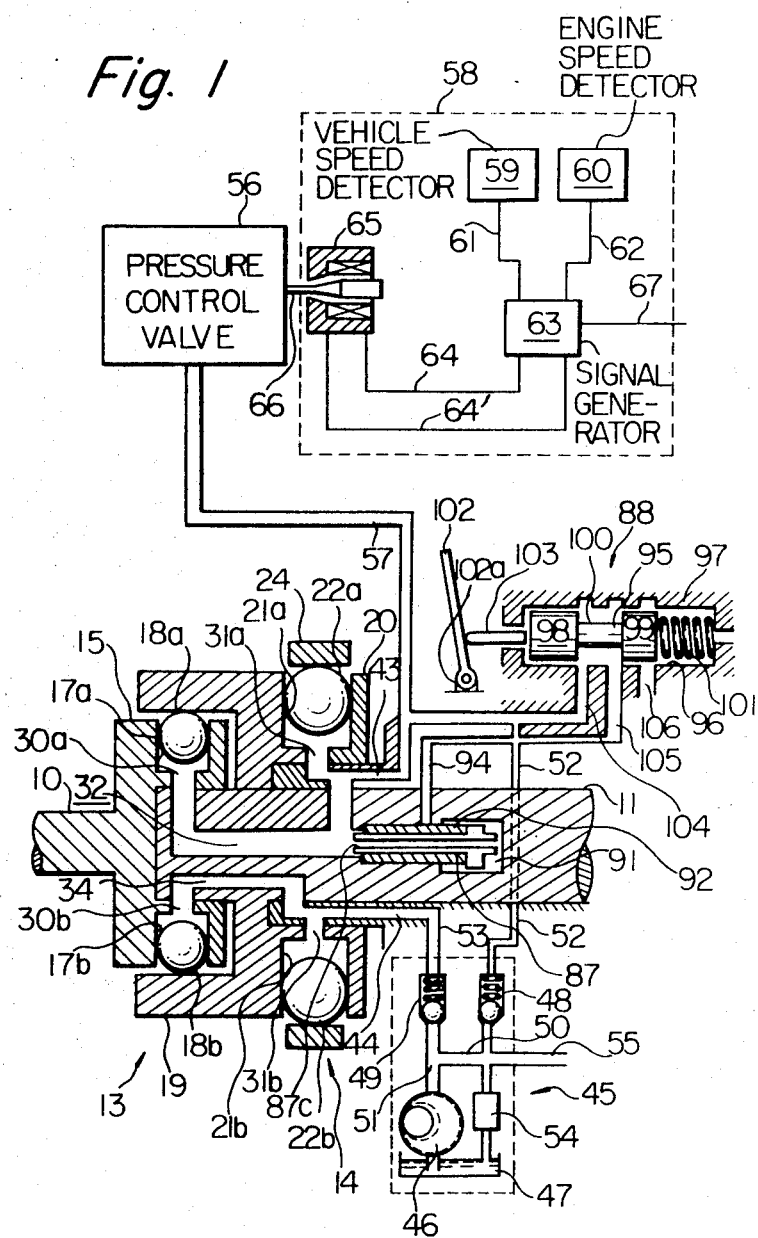

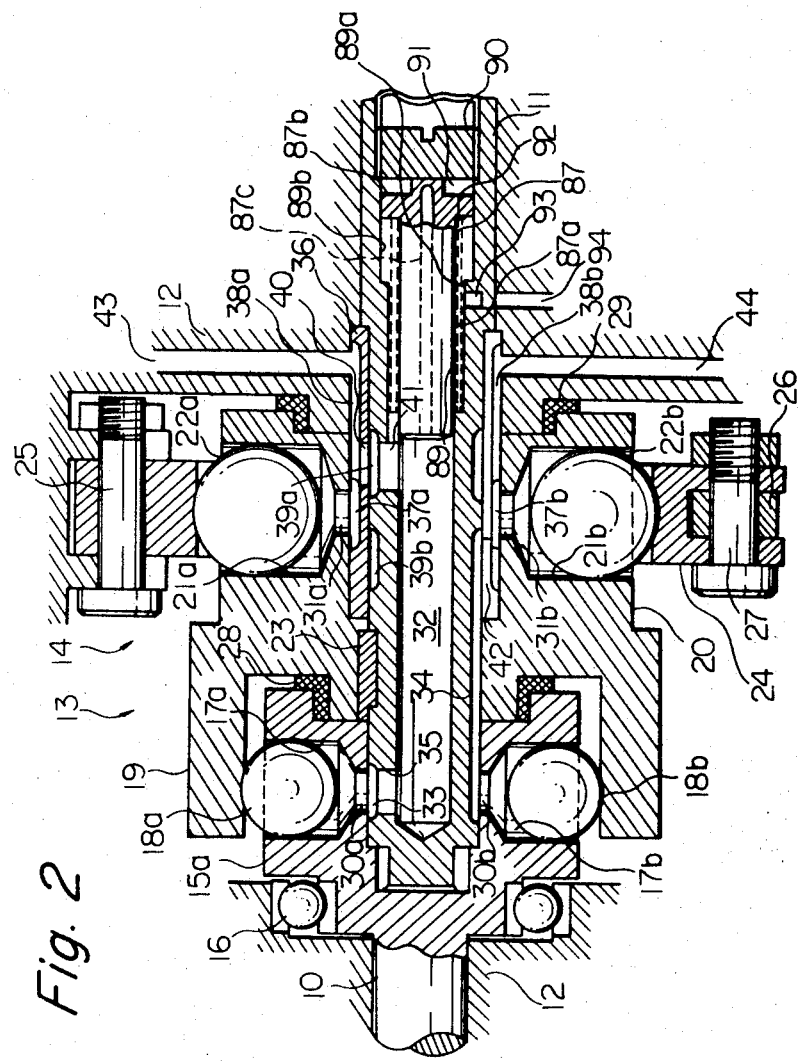

HYDROSTATIC POWER TRANSMISSION SYSTEM

The present invention relates generally to power transmission systems and, more particularly, to a hydrostatic power transmission system having steplessly variable speed ratio characteristics. Such transmission system is specifically adapted to be incorporated in an automotive driveline for the purpose of delivering power from a vehicle power plant such as an internal combustion engine or a gas turbine engine to the vehicle traction wheels.

The hydrostatic power transmission system to which the present invention is directed generally uses positive-displacement piston-type hydrostatic units with a closed hydrostatic circuit to provide power delivery paths between the two fluid displacement units. One of these hydrostatic units is a constant fluid displacement unit acting as a pump to supply fluid power and the other of the units is a variable fluid displacement unit acting as a hydraulic motor which is driven by the pump unit. Both the pump and motor units are of the piston type using, for instance, ball piston elements and are respectively connected to suitable driving and driven members which may be input and output shafts of a power train of the motor vehicle driveline. Power from the driving member or transmission input shaft is delivered to the driven member or transmission output shaft by the aid of fluid as a result of the pump delivery and the fluid pressure. Thus, the hydrostatic power transmission system dealt with by the present invention is of the split power path type using the constant fluid displacement unit as the pump.

The positive-displacement piston-type power transmission systems are generally adapted to provide ease and simplicity of operation for their ability to steplessly deliver outputs of various speed and torque ratios from a given input power. Such stepless change of the speed and torque ratios and even reversed motions in the hydraulic motor units can be effected without use of clutches and geared reduction mechanisms, thus contributing to simplicity of construction of the transmission system as a whole.

The hydrostatic power transmission system of the split power path type, in particular, features a torque transmission efficiency which is considerably higher than that attainable in other transmission systems. A problem is, however, encountered in the hydrostatic power transmission system of the split power path type in that the transmission output shaft can not be brought to a full stop as long as the transmission input shaft is in operation because of the limitation on the maximum reduction ratio available. Some hydrostatic power transmission systems therefore have their hydrostatic circuits constructed in such a manner that the hydrostatic circuit is opened to drain off the working fluid during neutral condition of the transmission system. When transmission of the power is to be started from the neutral condition, the hydrostatic circuit is closed so that the fluid power is built up instantaneously in the hydrostatic circuit. Such instantaneous development of fluid power causes abrupt variation in the transmission torque so that shocks are invited to occur in the transmission system during starting.

Under direct-drive condition of the transmission system in which the output shaft is driven in synchronism with the input shaft, the fluid pressure supplied to the motor unit is subject to pulsation and thus noises are produced in the transmission system.

It is, therefore, an important object of the present invention to provide an improved positive-displacement hydrostatic power transmission system of the split power path type overcoming the above discussed problems inherent in the prior art hydrostatic power transmission systems.

It is another important object of the invention to provide an improved hydrostatic power transmission system of the split power path type having the steplessly variable torque and speed ratio characteristics that are adapted to provide ease and simplicity of operation.

It is still another important object of the invention to provide an improved hydrostatic power transmission system of the split power path type in which the stepless change of the torque and speed ratios and the reversed motion in the hydraulic motor units can be effected without use of clutches and geared reduction mechanisms so as to provide simplicity of construction of the transmission system.

It is still another important object of the invention to provide an improved hydrostatic power transmission system of the split power path type achieving increased torque transmission efficiencies.

It is still another important object of the invention to provide an improved hydrostatic power transmission system of split power path type in which substantially no mechanical shocks are invited when the output shaft is beginning to be driven from the neutral condition of the transmission system.

It is still another important object of the invention to provide an improved hydrostatic power transmission system of the split power path type which can be shifted to the neutral condition without opening the hydrostatic circuit to drain off the working fluid.

It is still another important object of the invention to provide an improved hydrostatic power transmission system of the split power path type in which the noises otherwise produced due to pulsation of the fluid pressure in the motor unit are prevented in a simple and economical manner.

It is still another important object of the invention to provide an improved hydrostatic power transmission system of the split power path type which can be snugly and compactly installed on motor vehicles.

These and other objects of the present invention are accomplished in a hydrostatic power transmission system which comprises a constant fluid displacement unit having a first rotary element which is rotatable with the driving member or transmission input shaft and a second rotary element which is rotatable with the driven member or transmission output shaft, the first rotary element being in driving engagement with the second rotary element by means of a fluid pressure acting upon the second rotary element, a variable fluid displacement unit having a rotary element which is rotatable with the second rotary element of the constant fluid displacement unit and an adjustable stationary element which is rockable over the rotary element of the variable fluid displacement unit with respect to an axis of rotation thereof so as to vary the displacement of the fluid output of the variable fluid displacement unit for steplessly varying the ratios between the torques and speeds of the driving and driven members or transmission input and output shafts, a fluid distribution circuit interconnecting the first rotary element of the constant fluid displacement unit and the rotary element of the variable fluid displacement unit for transmitting fluid power between the two units, and a fluid pressure control mechanism for continuously controlling the pressure of the fluid in the fluid distribution circuit from zero to maximum in accordance with predetermined operational variables. The fluid pressure control mechanism is operable to reduce the fluid pressure in the fluid distribution circuit to zero when the transmission system is brought into a neutral condition and to gradually increase the pressue from zero when the transmission system is started to be driven from the neutral condition by the driving member.

The fluid pressure control mechanism playing an important role in the hydrostatic power transmission system according to the present invention may comprise a fluid pressure control valve unit which includes a control fluid circuit communicating with a control fluid drain port which is opened to the outside, a controlled fluid circuit leading from the fluid distribution circuit between the constant and variable fluid displacement units and communicating with the control fluid circuit, the pressure of the fluid in the control circuit being lower than the pressure of the fluid in the controlled fluid circuit, a main spool valve which is provided at its opposite ends with lands having different working areas, the land with the larger working area being acted upon by the fluid pressure in the control fluid circuit and the land with the smaller working area being acted upon by the fluid pressure in the controlled fluid circuit, and an auxiliary spool valve projecting into the control fluid circuit and biased to disconnect the control fluid circuit from the afore-mentioned control fluid drain port, and a valve control unit including a plungered solenoid which is adapted to be energized in accordance with the aforesaid predetermined operational variables. The auxiliary spool valve is subject at one end face thereof to the fluid pressure in the control fluid circuit and at the other end face to a mechanical pressure exerted by the plungered solenoid of the valve control unit. The auxiliary spool valve is thus movable depending upon the condition of the plungered solenoid, viz., in accordance with the aforesaid operational variables. When the fluid pressure in the control fluid circuit is higher than the mechanical pressure exerted on the auxiliary spool valve by the plungered solenoid, then this spool valve is moved to connect the control fluid circuit to the control fluid drain port thereby to reduce the fluid pressure in the control fluid circuit and accordingly move the main spool valve to a position to reduce the fluid pressure in the controlled fluid circuit.

The control fluid circuit may comprise a control fluid chamber into which the land with the larger working area of the main spool valve projects while the controlled fluid circuit may comprise a controlled fluid chamber into which the land with the smaller working area of the main spool valve projects, and first, second and third branch passages which are led from the fluid distribution circuit. The first branch passage communicates with the control fluid chamber through a restriction or orifice, the second branch passage communicates with the controlled fluid chamber, and the third branch passage communicates with a controlled fluid drain port. The main spool valve is in a position to connect the third branch passage with the controlled fluid drain port when the fluid pressure force acting upon the land with the smaller working area of the main spool valve is lower than the fluid pressure force acting upon the land with the larger working area so that the fluid in the controlled fluid circuit is drained off until the pressures in the control and controlled fluid chambers are equalized to each other.

The valve control unit associated with the thus constructed fluid pressure control valve unit may be constructed and arranged in any desired manner depending upon the application of the transmission system. Where, for example, the transmission system is placed for use on a motor vehicle driveline, the valve control unit may include, in addition to the above-mentioned plungered solenoid, means for supplying a signal substantially proportional to the speed of the motor vehicle, means for supplying a signal substantially proportional to the resolving speed of the engine crankshaft, and a signal generator supplying a signal voltage representing the signals supplied from these two means. The signal generator is connected to the plungered solenoid so that the solenoid is energized to have its plunger forced toward the auxiliary spool valve of the fluid pressure control valve unit substantially proportional to the signal voltage supplied thereto from the signal generator. The signal generator is constructed to control the fluid pressure control valve unit in a manner to reduce the fluid pressure in the controlled fluid circuit and accordingly in the fluid distribution circuit to zero when the vehicle stops and the engine operates at a relatively low speed and to gradually increase the fluid pressure as the engine speed increases.

For the prevention of the noises otherwise produced due to the pulsation of the pressure in the fluid directed to the variable fluid displacement unit during a direct-drive condition, the power transmission system according to the present invention may be preferably provided with a fluid shut-off valve arrangement which is responsive to the direct-drive condition of the transmission system so that the passage of fluid to the rotary element of the variable fluid displacement unit through the fluid distribution circuit is interrupted when the direct-drive condition is established in the transmission system. This fluid shut-off valve arrangement may comprise a fluid shut-off valve member movable in the fluid distribution circuit and having a flange portion which has one end face subject to the fluid pressure in the fluid distribution circuit and the other end face usually subject to the fluid pressure directed from the fluid distribution circuit through a valve control fluid line which is in communication with a drain port, and a control valve member responsive to the direct-drive condition and biased to disconnect the valve control fluid line from the drain port. When, thus, the control valve member responds to the direct-drive condition, then the valve member is moved to connect the valve control fluid line to the drain port so as to reduce the fluid pressure acting upon the aforesaid other end face of the flange of the fluid shut-off valve member. The fluid shut-off valve member is consequently moved to a position to interrupt the passage of the fluid from the fluid distribution circuit to the rotary element of the variable fluid displacement unit.

In a preferred form of the power transmission system according to the present invention, the first rotary element of the constant fluid displacement unit and the rotary element of the variable fluid displacement unit may be made up of separate cylinder blocks which are rotatable about an axis of rotation of the driven member or output shaft and ball piston elements accommodated in the cylinder blocks. Each of the cylinder blocks has radially extending cylinder or cylindrical chambers within each of which one of the ball piston elements is received movably toward and away from the axis of rotation of the cylinder block. The second rotary element of the constant fluid displacement unit is, in this instance, constituted as a cam ring which is positioned around the associated cylinder block with the ball piston elements held in frictional contact with an inner cam surface of the cam ring. This inner cam surface is suitably offset with respect to the axis of rotation of the cylinder block of the constant fluid displacement unit so that fluid power is delivered from the unit when the cylinder block is rotated on or with the associated cam ring. The amount of offset of the cam surface from the axis of rotation of the cylinder block is predetermined and fluid power is delivered at a fixed rate. The adjustable stationary element of the variable fluid displacement unit is essentially similar to the second rotary element of the constant fluid displacement unit, constructed as a cam ring which is positioned around the associated cylinder block with the ball piston elements held in frictional contact with its inner cam surface. Different from the cam ring of the constant fluid displacement unit, the cam ring of the adjustable stationary member is movable or rockable within a plane transverse to the axis of rotation of the associated cylinder block so that the amount of offset of its inner cam surface with respect to the axis of rotation of the cylinder block can be varied depending upon the position of the cam ring relative to the associated cylinder block. The fluid displacement of the variable fluid displacement unit is in this manner varied by adjusting the relative position of its cam ring. The cylinder block of the constant fluid displacement unit is rotatable with the driving member or input shaft, while the cam ring of the constant displacement unit and the cylinder block of the variable fluid displacement unit are rotatable with the driven member or output shaft. The adjustable cam ring of the variable fluid displacement unit on the other hand, is adjusted in accordance with a selected or desired mode of operation of the transmission system. The fluid distribution circuit providing power delivery paths between the two fluid displacement units may be formed within and in an outer peripheral wall of the driven member or output shaft.

Other features and advantages of the positive-displacement hydrostatic power transmission system according to the present invention will become more apparent from the following detailed description taken in association with the accompanying drawings in which:

FIG. 1 is a longitudinal sectional view schematically showing an overall construction of the transmission system in a preferred form, according to the present invention with the fluid pressure control mechanism illustrated in a block form;

FIG. 2 is a longitudinal sectional view showing essential operational parts and elements of the transmission system shown in FIG. 1;

Figure 3A:
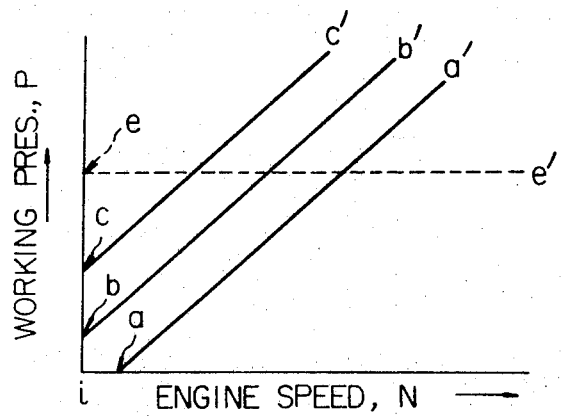
FIGS. 3A and 3B are graphic representations of the variations in the working fluid pressure in terms of the engine speed as operable on the power transmission system according to the present invention.

Reference is now made concurrently to FIGS. 1 and 2, in which the power transmission system is assumed to be incorporated in a motor vehicle driveline including a transmission input shaft 10 as a driving member and a transmission output shaft 11 as a driven member which is in line with the transmission input shaft. The input shaft 10 is connected to and driven by a crankshaft (not shown) of a vehicle power plant which may be an internal combustion engine or a gas turbine engine as the case may be. The output shaft 11, on the other hand, is connected to the vehicle traction wheels through a suitable driveline, though not shown. The transmission system as a whole is encased within a transmission housing which is generally indicated by reference numeral 12.

The hydrostatic power transmission system includes a constant fluid displacement unit 13 acting as a pump unit to provide a source of fluid power and a variable fluid displacement unit 14 acting as a hydraulic motor and driven by the constant fluid displacement unit by means of fluid power. The constant fluid displacement unit 13 includes a cylinder block 15 which, in the embodiment shown, is integral with the transmission input shaft 10. This cylinder block 15 is rotatably supported on the transmission housing 12 through a bearing 16. The cylinder block 15 has a generally circular cross section which is substantially coaxial with the input and output shafts 10 and 11, respectively, and is formed with a suitable number of substantially equidistantly spaced, radially extending piston cylinders which are shown as generally cylindrical openings or chambers 17a, 17b,... extending toward an axis of rotation of the cylinder block 15. The cylindrical chambers 17a and 17b as appearing in the drawings are assumed to be diametrically opposed to each other across the axis of rotation of the cylinder block 15. Ball piston elements 18a, 18b, ... are received in the cylindrical chambers 17a, 17b ..., respectively, in a manner that they are slidable toward and away from the axis of rotation of the cylinder block 15. The cylinder block 15 is surrounded by a cam ring 19 having a cam surface with which the individual ball piston elements 18a, 18b, are in frictional engagement. The cam ring 19 is so configured that a certain degree of eccentricity is defined between its inner cam surface and the axis of rotation of the cylinder block 15. This inner cam surface is usually formed with an annular groove so as to add to the area of frictional contact between the cam surface and the individual ball piston elements, though not shown.

The variable fluid displacement unit 14 is constructed generally analogously to the constant fluid displacement unit 13, thus including a cylinder block 20 which is formed with radially extending, substantially equidistantly spaced cylindrical openings or chambers 21a, 21b, ... in which ball piston elements 22a, 22b, ..., respectively, are radially slidably received. Of these cylindrical chambers 21a, 21b, ... the chambers 21a and 21b, in particular, are assumed to be diametrically opposed to each other as in the case with the constant fluid displacement unit 13. The cylinder block 20 is keyed as at 23 or otherwise splined to the transmission output shaft 11 and is integral with the cam ring 19 of the constant fluid displacement unit 13. An adjustable cam ring 24 surrounds the cylinder block 20 with the ball piston elements 22a, 22b, ... in frictional engagement with its inner cam surface. Different from the cam ring 19 of the constant fluid displacement unit 13, this cam ring 24 is pivotally connected to the transmission housing 12 through a pin 25 so as to be rockable in a plane which is transverse to an axis of rotation of the cylindrical block 20 which is substantially coaxial with the transmission output shaft 11. The cam ring 24 thus being position-adjustable with respect to the associated cylinder block 20, controlled degrees of eccentricity are established between the inner cam surface of the cam ring 24 and the axis of rotation of the cylinder block 20 depending upon the angular position of the cam ring. This angular position of the cam ring 24 is varied by the use of a suitable actuating mechanism which is responsive to the selected or desired modes of operation of the transmission system through detection of the vehicle speed, degree of carburetor throttle opening and/or vacuum in an engine intake manifold. This actuating mechanism is herein shown to include, by way of example, a piston rod 26 connected to the cam ring 24 through a pin 27 which is diametrically opposed to the pivotal pin 25. This piston rod 26 may be connected to a suitable control piston which is responsive to the above-mentioned operational variables of the motor vehicle, though not illustrated. The construction and operation of such actuating mechanism is rather immaterial for an understanding of the present invention and, as such, no detailed description will be herein incorporated. Designated by reference numerals 28 and 29 are bearings through which the unitary structure of the cam ring 19 and cylinder block 20 are rotatable on the cylinder block 15 and transmission housing, respectively.

Fluid communication is established between the cylindrical chambers 17a, 17b, ... of the constant fluid displacement unit 13 and the cylindrical chambers 21a, 21b, ... of the variable fluid displacement unit 14 through a fluid distribution circuit in a manner that driving torques are transmitted between the two units under various modes of operation of the transmission system. To construct such fluid distribution circuit, the cylinder block 15 has formed at its inner peripheral wall radial ports 30a, 30b, ... merging respectively from the cylindrical chambers 17a, 17b, ... while the cylinder block 20 is formed with radial ports 31a, 31b, ... merging respectively from the cylindrical chambers 21a, 21b, ... as shown. These radial ports 30a, 30b, ... and 31a, 31b, ... are opened toward the transmission output shaft 11 terminating close to a leading end of the transmission input shaft 10. The transmission output shaft 11 has formed therein an axially extending bore 32 which is substantially coextensive with the fluid displacement units 13 and 14. The output shaft 11 has further formed in its outer peripheral wall a semi-circumferential groove 33 which is coextensive with the radial port 30a in the cylinder block 15 and an elongate groove 34 having one end coextensive with the radial port 30b in the cylinder block 15 and the other end close to the cylinder block 20. The semi-circumferential groove 33 and elongated groove 34 are diametrically opposed to each other so that, when the transmission output shaft 11 assumes the rotational position which is illustrated, they communicate with the radial ports 30a and 30b, respectively, in the cylinder block 15. The semi-circumferential groove 33 communicates with the axial bore 32 through a radial passage 35 formed in the output shaft 11.

Between the transmission output shaft 11 and the cylinder block 20 of the variable fluid displacement unit 14 is interposed a sleeve 36 which is held stationary relative to the transmission housing 12 so that the output shaft 11 and fluid displacement unit 14 are rotatable relative to the sleeve 36. The sleeve 36 has formed in its outer peripheral wall a pair of substantially diametrically opposed semi-circumferential grooves 37a and 37b which are coextensive with the radial ports 31a and 31b in the cylinder block 20 and elongate groove 38a and 38b adjoining with the semi-circumferential grooves 37a and 37b, respectively.

The transmission output shaft 11 has formed in its outer peripheral wall a pair of spaced annular grooves 39a and 39b which are adjacent the surrounding sleeve 36. One annular groove 39a communicates on one side with the elongate groove 38a through a port 40 formed in the sleeve 36 and on the other side with the axial bore 32 through a port 41 formed in the output shaft 11. The other annular groove 39b communicates on one side with the semi-circumferential groove 37a through a port 42 formed in the sleeve 36 and merges on the other side with the elongate groove 34 in the output shaft 11.

When, thus, the transmission output shaft 11 and the cylinder block 20 integral therewith assume the shown rotational positions in which the radial ports 31a and 31b in the cylinder block 20 are aligned respectively with the semi-circumferential grooves 37a and 37b in the sleeve 36, fluid communication is estalished between the radial port 31a and axial bore 32 through the semi-circumferential groove 37a, elongate groove 38a, port 40, annular groove 39a and port 41 and between the radial port 31b and elongate groove 34 through the semi-circumferential groove 37b, port 42 and annular groove 39b. Under this condition, the cylindrical chambers 17a and 17b of the constant fluid displacement unit 13 communicate with the cylindrical chambers 21a and 21b, respectively through two independent fluid paths.

The elongate grooves 38a and 38b in the sleeve 36 communicate with fluid passages 43 and 44, respectively, which are formed in the transmission housing 12. These fluid passages 43 and 44 are led to a source of pressurized fluid which is generally indicated at reference numeral 45 in FIG. 1.

This fluid source 45 includes an oil pump 46 which is operable to suck in oil from an oil sump 47 and deliver a pressurized fluid in a well known manner. The pressurized fluid directed to two one-way check valves 48 and 49 through fluid lines 50 and 51, respectively. These check valves 48 and 49 may be of any desired construction, although they are herein shown, by way of example, as including spring loaded ball check valves, not numbered. Downstream of the one-way check valves 48 and 49 are provided passages 52 and 53 which communicate with the fluid passages 43 and 44, respectively. The one-way check valve 48 thus serves to prevent a drop of the fluid pressure in the axial bore 32 in the output shaft during reverse drive condition of the transmission system and to prevent leakage of the fluid from this axial bore. The one-way check valve 49, on the other hand, serves to maintain the fluid pressure in the fluid path including the elongate groove 34 of the output shaft 11 and to prevent the fluid pressure in this fluid path from escaping therefrom. A fluid pressure regulator 54 is connected to the fluid lines 50 and 51 so as to regulate the pressure of the fluid passed to the one-way check valves 48 and 49 in a manner that excess fluid is returned to the oil sump 47 in the event the fluid pressure delivered from the oil pump 46 rises beyond a predetermined level during operation of the transmission system. Designated by reference numeral 55 is a fluid line leading from the fluid lines 50 and 51 and connected to any usual or optional hydraulic unit or units which may be provided in association with the transmission system or for other purposes. The above description of the construction and operation of the pressurized fluid supply source is solely for the purpose of illustration and, as such, the same may be changed and modified in any desired manner.

The hydrostatic power transmission system thus constructed is provided with a mechanism which is adapted to control the pressure of the fluid in the fluid path including the axial bore 32 in the transmission output shaft 11. Such fluid pressure control mechanism is illustrated in FIG. 1 in a block form as including a fluid pressure control valve unit 56 connected through a fluid line 57 with the fluid passage 43 leading from the axial bore 32 in the transmission output shaft 11 and a valve control unit 58 which is adapted to control the valve unit 56 in accordance with any predetermined operational variables. Such operational variables may be selected as desired depending upon the application of the transmission system and, where the transmission system is to be incorporated in a motor vehicle driveline, it is preferable that they include vehicle and engine speeds, as previously noted. Thus, the valve control unit 58 comprises a vehicle speed detector or means 59 adapted to sense the vehicle speed and supply a signal proportional to the vehicle speed and an engine speed detector or means 60 adapted to sense the engine speed and supply a signal proportional to the engine speed. The signals supplied by these means 59 and 60 may be of any desired nature but it is preferable that they be electric signals proportional to the detected vehicle and engine speeds. The means 59 and 60 are connected through lines 61 and 62, respectively, to a signal generator 63 which is operable to supply a signal voltage which is produced in accordance with the signals which the signal generator receives from the means 59 and 60. The signal generator 63 in turn is connected by electric lines 64 and 64' to a plungered solenoid 65 having a combination armature and plunger 66 which is biased to its retracted position. This plungered solenoid 65 is constructed in a manner that the plunger 66 is caused to protrude a distance which is proportional to the signal voltage with which the solenoid 65 is energized from the signal generator 63. Designated by reference numeral 67 is a line which may be provided where it is desired that the signal voltage supplied from the signal generator represent any other operational variable or variables.

The operation of the hydrostatic power transmission system thus constructed will now be described.

It is assumed that the speeds of rotation of the transmission input and output shafts 10 and 11 are $N_1$ and $N_2$, respectively, wherein $N_1 > N_2$ and that the fluid displacements of the constant and variable fluid displacement units 13 and 14 are $V_1$ and $V_2$, respectively. With the input shaft 10 thus driven at speed $N_1$ and the output shaft 11 driven at speed $N_2$, the cylinder block 15 and cam ring 19 of the constant fluid displacement unit 13 are driven at speeds $N_1$ and $N_2$, respectively. It therefore follows that the fluid is delivered from the cylindrical chambers 17a ... of the fluid displacement unit 13 at a rate of $(N_1 - N_2) \cdot V_1$ per unit time. This fluid is passed to the cylindrical chambers 21a ... of the variable fluid displacement unit 14 through the radial ports 30a ..., semi-circumferential groove 33, radial passage 35, axial bore 32, port 41, annular groove 39a, port 40, elongate groove 38a, semi-circumferential groove 37a and radial ports 31a ... in this sequence. Simultaneously, the fluid is passed from the cylindrical chambers 21b ... of the variable fluid displacement unit 14 to the cylindrical chambers 17b ... of the constant fluid displacement unit 13 through the radial ports 31b ..., semi-circumferential groove 37b, port 42, annular groove 39b, elongate groove 34 and radial ports 30b ... in this sequence. Under this condition, the adjustable cam ring 24 of the variable fluid displacement unit 14 is held stationary relative to the transmission housing 12 and at the same time the cylinder block 20 integral with the cam ring 19 of the fluid displacement unit 13 is rotated at speed $N_2$. The displacement of the fluid from the variable fluid displacement unit 14 is therefore $N_2 \cdot V_2$. This fluid displacement must be equal to the fluid displacement of the constant fluid displacement unit 13, hence, $$V_1 \cdot (N_1 - N_2) = V_2 \cdot N_2$$

(Eq. 1)

Thus, the speed reduction ratio R is given as follows:

$$R = N_1/N_2 = V_2/V_1 + 1.$$

(Eq. 2)

If the ratio between the displacements of the constant fluid displacement units 13 and 14, respectively, is $m$, so that $V_2/V_1 = m$, then $$R = m + 1.$$

(Eq. 3)

In order that the motor vehicle be brought to a full stop, the value $R$ must be infinite. Since, however, the value $V_1$ is a constant and the value $V_2$ is limited, the value $R$ can not be infinite and as a result the motor vehicle can not be stopped as long as the engine is being driven.

The torque on the transmission output shaft 11 is related to the fluid displacements of the fluid displacement units 13 and 14 and to the pressure of the fluid to be delivered from the unit 13 to the unit 14. This suggests that the transmission output shaft 11 can be cleared of the driving torque if the fluid pressure passed to the variable fluid displacement unit 14 is reduced to zero and that the shocks resulting from the abrupt variation in the torque on the outer shaft 11 can be avoided if this fluid pressure is varied or increased gradually when the motor vehicle is to start or to be driven at a low speed. The fluid pressure control valve unit 56 and valve control unit 58 as hereinbefore discussed are arranged in a manner to control the fluid pressure on this principle. Such control of the fluid pressure can be accomplished generally in two different fashions, one being to continually vary the fluid pressure and the other being to stepwise vary the fluid pressure.

FIG. 3A illustrates an example of the practices of varying the fluid pressure on a stepless basis, wherein the axis of abscissa represents the engine speed $N$ while the axis of ordinate stands for the fluid pressure $P$. The origin $i$ indicates the condition in which the motor vehicle is stopped and the engine is idling. When the engine speed N is increased toward $a$, the fluid pressure $P$ is maintained at a zero level. As the engine speed $N$ rises beyond $a$, the fluid pressure P increases accordingly as indicated by line $a-a'$ so that the torque on the output shaft increases. Lines $b-b'$ and $c-c'$ indicate variations of the fluid pressure in terms of the engine speed as attained when the motor vehicle is driven at given speeds. Line $e-e'$ shows a fluid pressure established when the engine torque reaches the maximum value.

Figure 3B:
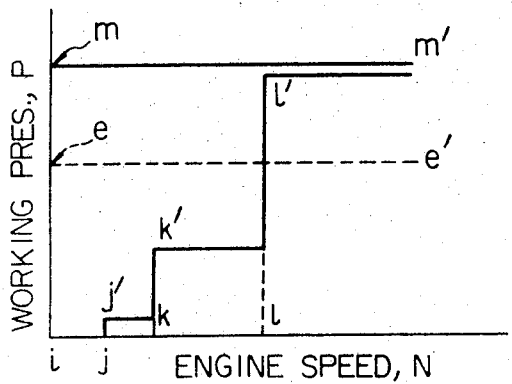

FIG. 3b illustrates an example in which the fluid pressure is varied stepwise. The fluid pressure $P$ is zero when the motor vehicle is stopped and the engine is idling as indicated at $i$. The fluid pressure is maintained at the zero level as long as the engine is driven at a speed lower than $j$. When the engine speed $N$ increases beyond $j$, the fluid pressure P jumps to $j'$ and, as the engine speed further rises up to $k$ and to $l$, then the fluid pressure is increased stepwise to $k'$ and to $l$, respectively, In order that the engine is driven from the traction wheels during intermediate and high speed driving of the motor vehicle, it is preferable that the fluid pressure P is maintained constant as indicated by line $m-m'$ when the engine is driven at a speed higher than $j$.

The fluid pressure characteristics as above described are achieved by the operation of the valve control unit 58 of the fluid pressure control mechanism shown in FIG. 1. Thus, the signal voltage supplied to the plungered solenoid 65 follows the lines $i-a-a'$, $b-b'$ and $c-c'$ in FIG. 3A or the stepped lines $i-j'-k'-l'$ and $m-m'$ in FIG. 3B.

When the motor vehicle is to be started or to be driven at a low speed, the value $m$ of Eq. 1 should be increased to a maximum whereupon the fluid pressure acting upon the variable fluid displacement unit 14 is controlled by the control valve unit 56 and valve control unit 58 in accordance with the above discussed fluid characteristics. This value $m$ can be varied by varying the angular position of the adjustable cam ring 24 relative to the associated cylinder block 20 of the variable fluid displacement unit 14. As the vehicle speed is increased, this cam ring 24 is position-adjusted to reduce the displacement of the fluid displacement unit 14 so that the value $m$ and accordingly the speed reduction ratio $R$ are reduced. The cam ring 24 is controlled in accordance with suitable operational variables such as the vehicle speed, carburetor throttle opening and/or engine intake vacuum, as previously noted.

Figure 4:
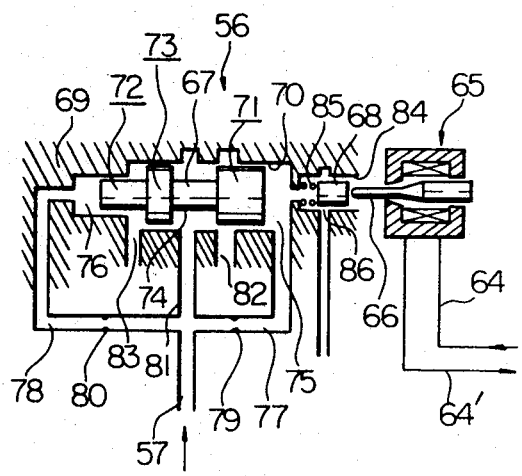
FIG. 4 is a longitudinal sectional view showing a preferred form of the pressure control valve unit of the fluid pressure control mechanism diagrammatically illustrated in FIG. 1.

The fluid pressure control unit 56 thus playing an important role in the transmission system according to the present invention may be constructed in any desired manner insofar as it is capable of controlling the fluid pressure in compliance with the mechanical signal supplied by the plungered solenoid 65 of the valve control unit 58. To enable the engine to be advantageously driven from the (two-way) vehicle traction wheels, this control valve unit 56 may preferably be arranged so that the fluid pressure is maintained above the zero level as long as the vehicle speed is higher than a predetermined level even though the engine speed is increased. A preferred form of the fluid pressure control valve unit 56 constructed to accomplish these purposes is illustrated in FIG. 4. The valve unit 56 herein shown operates in such a manner that a relatively low control fluid pressure is produced which is substantially proportional to the working fluid pressure to be controlled and the control fluid pressure is varied in proportion to a given mechanical signal. This mechanical signal is, in this instance, the amount of displacement of the plunger 66 of the solenoid 65 of the valve control unit 58 associated with the control valve unit. The variation in the control fluid pressure is "fed back" to the working fluid pressure which, as a consequence, is varied to be substantially proportional to the control fluid pressure and accordingly to the amount of displacement of the plunger. The control fluid pressure is in this manner utilized as if it were a servo means and, therefore, the input signal to the solenoid can be of relatively low voltage, to advantage in the construction of the control mechanism as a whole and in power consumption by the control unit.

Referring now to FIG. 4, the fluid pressure control valve unit 56 includes main and auxiliary spools 67 and 68. Respectively, which are encased within a valve housing 69. The main spool 67 is axially slidable in a bore 70 in the valve housing 69 and has lands 71 and 72 formed at its opposite end and an intermediate land 73 located between the lands 71 and 72. The intermediate land 73 is spaced from the land 71 so that an annular groove 74 is formed between the lands 71 and 73, as shown. The lands 71 and 73 have working areas which are larger than a working area of the land 72. The main spool 67 defines in the bore 70 two fluid chambers 75 and 76 on the outer sides of the lands 71 and 72. These fluid chambers 75 and 76 are herein referred to as control and controlled fluid chambers, respectively. The control and controlled fluid chambers 75 and 76 communicate with a fluid line 57 through branch passages 77 and 78, respectively. The branch passages 77 and 78 are provided with calibrated restrictions or orifices 79 and 80, respectively. An unrestricted branch passage 81 leads from the fluid line 57 and opens into the annular groove 74 so that the fluid pressure in the fluid line 57 is constantly directed to the annular groove. It may be noted in this instance that this fluid pressure directed to the annular groove 74 imparts no driving effort to the main spool 67 because the lands 71 and 73 acted thereupon have equal working areas. Drain ports 82 and 83 lead from the bore 70 and are opened to a suitable oil sump which may be the oil sump 47 shown in FIG. 1. One drain port 82, herein referred to as a controlled fluid drain port, is located so as to be closed when the pressure force in the control fluid chamber 75 is higher than the pressure force in the controlled fluid chamber 76 and accordingly the spool 67 is moved toward the controlled fluid chamber 76 and opened when a converse condition is established. The other drain port 83 is intended to release a back pressure, if any, on the intermediate land 73 when the spool 67 is moved toward the controlled fluid chamber 76.

The auxiliary spool 68, which is built as a piston as illustrated, is axially slidable in a bore 84 formed in the valve housing 69. The bore 84 is smaller in diameter than the bore 70 and communicates with the control fluid chamber 75. The auxiliary spool 68 is biased away from the control fluid chamber 75 by suitable resilient means such as a compression spring 85 which is seated on an inner end face of the spool 68. The spool 68 is held in abutting engagement at its outer end face with the plunger 66 of the solenoid 65 of the valve control unit 58. The spool 68 thus assumes a balanced position when the combined force resulting from the fluid pressure acting thereupon from the control fluid chamber 75 and the action of the compression spring 85 is equalized with the mechanical pressure exerted thereon by the plunger 66. A control fluid drain port 86 leads from the bore 84. This drain port 86 is located to be closed when the above mentioned combined force is overcome by the pressure applied to the spool 68 by the plungered solenoid 65 and consequently the spool 68 is moved toward the control fluid chamber 75. The drain port 86 is opened when a converse condition is established.

In operation, the fluid pressure in the fluid line 57 is directed to the control and controlled fluid chambers 75 and 76 through the orifices 79 and 80, respectively, and concurrently to the annular groove 74 without restriction. The fluid pressure directed to the control fluid chamber 75 acts upon the land 71 to urge the main spool 67 away from the control fluid chamber. This fluid pressure is admitted to the bore 84 and presses upon the auxiliary spool 68. The auxiliary spool valve 68 is consequently moved away from the control fluid chamber 75 until it assumes the balanced position which is above mentioned. The fluid pressure in the control fluid chamber 75 and accordingly the bore 84 is lower than the pressure in the fluid line 57 due to provision of tee orifice 79. The difference between these pressures is thus related to the rate of flow of the fluid through this orifice 79.

The orifice 80 in the branch passage 78 is so calibrated that the pressure directed to the controlled fluid chamber 76 is substantially equal to the pressure in the fluid line 57. This fluid pressure in the controlled fluid chamber 76 acts upon the land 72 of the main spool 67 so that the main spool is urged away from the fluid chamber 76. The main spool 67 is in this manner subject to two different pressures at the end faces of its lands 71 and 72 and is moved in dependence upon the difference between these pressures. The pressures in the fluid chambers 75 and 76 are inversely proportional to the working areas of the lands 71 and 72, respectively. If, thus, the force urging the main spool 67 away from the controlled fluid chamber 76, viz., rightwardly of the drawing is greater than the opposing force wich urges the same away from the control fluid chamber 75, viz., leftwardly of the drawing, then the main spool 67 is moved to a position to open the controlled fluid drain port 82. The fluid in the fluid line 57 is consequently drained off through the branch passage 81 and annular groove 74 so that the pressure in the fluid line 57 is relieved. If, conversely, the force urging the main spool 67 away from the control fluid chamber 75 is greater than the force urging the same away from the controlled fluid chamber 76, then the spool 67 is moved to close the drain port 82 so that the pressure in the fluid line 57 rises. The main spool 67 is balanced when these mutually opposing forces are equalized, thereby establishing a controlled fluid pressure in the fluid line 57. This controlled fluid pressure is "fed back" to the controlled fluid chamber 76 without modification and to the control fluid chamber 75 after modification by the orifice 79. The modified relatively low fluid pressure acts upon the auxiliary spool 68 and opens the control fluid drain port 86 if the pressure exerted thereon by the plungered solenoid 65 yields to the combined force of the fluid pressure in the bore 84 and the action of the compression spring 85. The control pressure in the chamber 75 is thus relieved through the bore 84 and drain port 86 until the above mentioned combined force is equalized or overcome by the mechanical pressure exerted by the plungered solenoid 65. The control fluid pressure regulated in this manner acts upon the main spool valve 67 so as to be predominant over the fluid pressure in the fluid line 57 and accordingly in the fluid chamber 76.

Turning back to FIGS. 1 and 2, when the adjustable cam ring 24 of the variable fluid displacement unit 14 is position-adjusted to be concentrical with the associated cylinder block 20, then the displacement of the variable fluid displacement unit is interrrupted so that $m = 0$ and accordingly $R = 1$ (Eq. 3). The direct-drive condition is consequently established in the transmission system with the output shaft 11 driven at the same speed as the input shaft 10. In the absence of the displacement of the fluid in the variable fluid displacement unit 14 under this direct-drive condition, the fluid path leading from the unit 13 to the unit 14 may be blocked without affecting the performance characteristics of the transmission system. This is useful for preventing pulsation of the fluid pressure in the variable fluid displacement unit 14 and generation of noises therein during direct-drive condition of the transmission system. An arrangement adapted to realize this scheme is illustrated in FIGS. 1 and 2 as forming part of the transmission system. It should, however, be noted that such arrangement is incorporated in the transmission system solely by preference.

Referring to FIGS. 1 and 2, the fluid shut-off arrangement generally includes a fluid shut-off valve member 87 accommodated within the transmission output shaft 11 and a control valve unit 88 which is responsive to the direct-drive condition. To accommodate the fluid shut-off valve member 87 in the output shaft 11, the axial bore 32 has an extension 89 at its end close to the port 41 adjoining therewith. This extension 89 is closed by an end plug 90 and consists of a smaller-diameter bore 89a directly merging from the axial bore 32 and a larger-diameter bore 89b next to the smaller-diameter bore and closed by the end plug 90. The fluid shut-off valve member 87 is herein shown as a flanged plunger valve including, a plunger portion 87a, and a flange portion 87b. The plunger portion 87a has its leading end projecting into and slidably received in the axial bore 32 and extends throughout the smaller-diameter bore 89a of the extension 89. The flange portion 87b is formed at the opposite end of this plunger portion 87a and is slidably received in the larger-diameter bore 89b. The valve member 87 has formed therein an axial passage 87c axially extending from one end of the valve member to the other. A fluid member 91 is defined between the opposite end faces of the flange portion 87b of the valve member 87 and the end plug 90, forming part of the larger-diameter bore 89b of the extension 89. The axial passage 87c in the valve member 87 is thus opened at one end to the axial bore 32 and at the other to the fluid chamber 91. The flange portion 87b thus has one end face subject to the fluid pressure directed into the smaller diameter bore 87a and the other end face subject to the fluid pressure directed into the fluid chamber 91 from the axial bore 32 through the fluid passage 87c in the valve member 87. Suitable resilient means such as a compression spring 92 biases the valve member 87 toward the end plug 90, thereby compressing the fluid delivered to the fluid chamber 91. This compression spring 92 is shown as seated at one end on a stepped wall of the smaller-diameter bore 89a and at the other end on the flange portion 87b of the valve member. The smaller-diameter portion 89a of the extension 89 is led through a port 93 formed in the output shaft 11 to a fluid line 94 formed in the transmission housing 12 and directed to the control valve unit 88.

This control unit 88 includes a spool valve 95 which is axially movably received within a bore 96 formed in a housing 97. The spool valve 95 is made up of spaced lands 98 and 99 formed at its opposite ends and having substantially equal working areas and an annular groove 100 formed between these lands, as seen in FIG. 1. This spool 95 is biased in one direction by suitable resilient biasing means which may be a compression spring 101. The compression spring 101 is seated at one end on the end face of the land 99 of the spool and at the other on the end wall of the bore 96 so that the spool 95 is urged leftwardly of the drawing. The spool 95 is operatively associated with suitable control means which is capable of responding to the direct-drive condition of the transmission system. This control means is herein shown, by way of example, as comprising a control lever 102 which is pivotally secured as at 102a and an actuating rod 103 which abuts at one end on the lever 102 and which bears at the other end against the end face of the land 98 of the spool through an end wall portion of the valve housing 97. The control lever 102 is thus adapted to turn about the pivot 102a in a direction to move the spool 95 against the action of the compression spring 101 when it responds to the direct-drive condition. The bore 95 communicates with the fluid passage 43 and fluid line 94 through ports 104 and 105, respectively, and with a drain port 106 which is opened to the outside. These ports 104, 105 and 106 are located in such a manner that the ports 104 and 105 are opened to the annular groove 100 and the drain port 106 closed by the land 99 when the spool 95 receives no driving effort from the actuating rod 103 and rests in the illustrated axial position by the action of the compression spring 101 and that the port 104 is closed by the land 98 and the ports 105 and 106 opened to the annular groove 100 when the direct-drive condition is established so that the spool 95 is moved by the actuating rod 103 against the action of the spring 101. Thus, during the operational conditions excepting the direct-drive condition, the pressurized fluid in the fluid passage 43 (which leads from the axial bore 32 and fluid source 45 as previously described) is passed to the fluid line 94 through the annular groove 100 and, in turn, to the smaller-diameter bore 87a in the output shaft 11. During the direct-drive condition, the fluid communication between the fluid passage 43 and fluid line 94 is blocked and, instead, the fluid line 94 is permitted to communicate with the drain port 106. Under this condition, the fluid in the fluid line 94 is drained off through the drain port 106 so that the fluid pressure in the smaller-diameter bore and acting upon one end face of the flange portion 87b of the fluid shut-off valve member 87 is relieved and accordingly the valve member 87 is moved away from the end plug 90 against the action of the compression spring 95. The valve member 87 thus protrudes into the axial bore 32 and closes the port 41 leading from the axial bore. The result is that the fluid communication between the axial bore 32 and the cylindrical chambers 21a ... in the cylinder block 20 of the variable fluid displacement unit 14 is blocked. The fluid path between the constant and variable fluid displacement units 13 and 14 through the axial bore 32 is in his manner interrupted during the direct-drive condition of the transmission system so that pulsation of the fluid in the variable fluid displacement unit and resultant generation of the noises therein are prevented without affecting the performance characteristics of the transmission system.

It will now be appreciated from the foregoing description that the power transmission system according to the present invention has outstanding advantages over the prior art hydrostatic power transmission systems especially in the following respects:

a. The transmission system being constructed as the split power path hydrostatic type, higher performance efficiencies are available than in the conventional power transmissions.

b. Creep during standing of the motor vehicle is prevented because the fluid pressure in the hydrostatic units can be reduced to zero level.

c. Shocks otherwise invited during starting of the motor vehicle due to abrupt variation of the driving torque in the transmission system are avoided because the fluid pressure in the hydrostatic units is increased gradually depending upon the engine speed.

d. Shocks otherwise resulting from the shifting operation in the transmission system during driving of the motor vehicle are avoided because of the steplessly variable speed ratio characteristics of the transmission system.

e. Simplicity of construction with the ball-piston type hydrostatic units is utilized.

f. Noises are avoided and loss in the transmitted power minimized during direct-drive condition of the motor vehicle because the variable-fluid displacement unit is locked by interrupting the fluid path leading thereto from the constant fluid displacement unit.

What is claimed is:

1. A hydrostatic power transmission system for delivering a driving power from a driving member to a driven member which is substantially in line with the driving member comprising, in combination, a constant fluid displacement unit having first and second rotary elements which are rotatable with said driving and driven members, respectively, said first rotary element being in driving engagement with said second rotary element by means of a fluid pressure acting upon the first rotary element, a variable fluid displacement unit having a rotary element which is rotatable with said second rotary element of the constant fluid displacement unit and an adjustable stationary element which is position-adjustable with respect to said rotary element of the variable fluid displacement unit for varying the fluid displacement thereof, a fluid distribution circuit interconnecting said first rotary element of the constant fluid displacement unit and said rotary element of said variable fluid displacement unit for transmitting fluid power between the two fluid displacement units, and a fluid pressure control mechanism for continuously controlling the pressure of the fluid in said fluid distribution circuit from zero to maximum in accordance with predetermined operational variables, said control mechanism being operable to reduce the fluid pressure in said fluid distribution circuit to zero when the transmission system is brought to a neutral condition and to gradually increase the fluid pressure from zero when the transmission system is driven from the neutral condition by said driving member.

2. A hydrostatic power transmission system according to claim 1, in which said fluid pressure control mechanism comprises a fluid pressure control valve unit including a control fluid circuit communicating with control fluid drain port, a controlled fluid circuit leading from said fluid distribution circuit and communicating with said control fluid circuit through a restriction for building up in said control fluid circuit a fluid pressure lower than and substantially proportional to the fluid pressure in said controlled fluid circuit, a main spool, valve the spoool of which is provided at its ends with lands having different working areas, the land with the larger working area being acted upon by the fluid pressure in said control fluid circuit and the land with the smaller working area being acted upon by the fluid pressure in said controlled fluid circuit, and an auxiliary spool valve its spool projecting into said control fluid circuit and biased to disconnect the control fluid circuit from said control fluid drain port, and a valve control unit including a plungered solenoid which is energized in accordance with said predetermined operational variables, said auxiliary spool valve having one end face of its subject to the fluid pressure in said control fluid circuit and the other end face to a mechanical pressure exerted by said plungered solenoid, said auxiliary spool valve being moved to connect said control fluid circuit to said control fluid drain port for reducing the fluid pressure in the control fluid circuit and accordingly move the spool of said main spool valve to a position to reduce the fluid pressure in said controlled fluid circuit when the fluid pressure in said control fluid circuit is higher than said mechanical pressure exerted by said plungered solenoid.

3. A hydrostatic power transmission system according to claim 2, in which said control fluid circuit comprises a control fluid chamber into which said land with the larger working area projects and said controlle fluid circuit comprises a controlled fluid chamber into which said land with the smaller working area projects and first, second and third branch passages leading from said fluid distribution circuit, the first branch passage communicating with said control fluid chamber through said restriction, the second branch passage communicating with said controlled fluid chamber, and said third branch passage communicating with a controlled fluid drain port, said main spool valve being in a position to disconnect said third branch passage from said controlled fluid drain port when the fluid pressure force acting upon said land with the smaller working area is lower than the fluid pressure force acting upon said land with the larger working area.

4. A hydrostatic power transmission system according to claim 1, further comprising a fluid shut-off valve arrangement which is responsive to direct-drive condition of said transmission system for interrupting the fluid path leading from said constant fluid displacement unit to said variable fluid displacement unit through part of said fluid distribution circuit when the direct drive condition is established in the transmission system.

5. A hydrostatic power transmission system according to claim 4, in which said fluid shut-off arrangement comprises a fluid shut-off valve member movable in said fluid distribution circuit and having a flange portion which has one end face subject to the fluid pressure in said fluid distribution circuit and the other end face usually subject to said fluid pressure in the fluid distribution circuit a valve control fluid line which is in communication with a drain port and a control valve member responsive to the direct-drive condition and biased to disconnect said valve control fluid line from said drain port, said control valve member being moved to connect said valve control fluid line to said drain port for reducing the fluid pressure force acting upon said other end face of said flange portion to move said fluid shut-off valve member to a position to interrupt said fluid path from said constant fluid displacement unit to said variable fluid displacement unit when said control valve member responds to the direct-drive condition.

6. A hydrostatic power transmission system for delivering a driving power from a transmission input shaft to transmission output shaft of a motor vehicle comprising, in combination, a constant fluid displacement unit having first and second rotary elements which are rotatable with said input and output shafts, respectively, said first rotary element being in driving engagement with said second rotary element by means of a fluid pressure acting upon the first rotary element, a variable fluid displacement unit having a rotary element which is rotatable with said second rotary element of the constant fluid displacement unit and an adjustable stationary element which is position-adjustable with respect to said rotary element of the variable fluid displacement unit for varying the fluid displacement thereof, a fluid distribution circuit interconnecting said constant fluid displacement unit to said variable fluid displacement unit for transmitting a fluid power between the two fluid displacement units, and a fluid pressure control mechanism for continuously controlling the pressure of the fluid in said fluid distribution circuit from zero to maximum, said mechanism including means for supplying a signal substantially proportional to a speed of the motor vehicle, means for supplying a signal substantially proportional to a speed of a power plant of said motor vehicle, a signal generator connected to both of said means for supplying a signal voltage representing the signals supplied therefrom, a plungered solenoid connected to said signal generator for receiving said signal voltage and having a plunger which is movable in accordance with said signal voltage and a fluid pressure control unit associated with said plungered solenoid and connected to said fluid distribution circuit for controlling the fluid pressure in the circuit in accordance with the movement of said plunger of said solenoid.

7. A hydrostatic power transmission system for delivering a driving power from a driving member to a driven member which is in line with the driving member comprising, in combination, a constant fluid displacement unit including a cylinder block rotatable with said driving member and having formed therein generally cylindrical chambers extending radially of the cylinder block, ball piston elements inwardly and outwardly movably received in said cylindrical chambers respectively, and a rotary cam ring having a substantially circular inner cam surface with which said ball piston elements are in friction engagement, said cam ring being positioned in a manner to establish a certain eccentricity between said inner cam surface and an axis of rotation of said cylinder block, a variable fluid displacement unit including a cylinder block rotatable with said rotary cam ring of the constant fluid displacement unit and said driven member and having formed therein a plurality of generally cylindrical chambers extending radially of the cylinder block, ball piston elements inwardly and outwardly movably received in said cylinder block of the variable fluid displacement unit and an adjustable cam ring pivotally connected to any stationary member and having a substantially circular cam surface with which said ball piston elements of the variable fluid displacement unit are in friction engagement, said adjustable cam ring being position adjustable with respect to the corresponding cylinder block for establising controlled degrees of eccentricity between the cam suface of said cam ring and an axis of rotation of the associated cyinder block of the variable fluid displacement unit, a fluid distribution circuit formed within and in an outer peripheral wall of said driven member and interconnecting said cylindrical chamber of the constant and variable fluid displacement units for transmitting a fluid power between the two fluid displacement units, and a fluid pressure control mechanism for continuously controlling the pressure of the fluid in said fluid distribution circuit from zero to maximum in accordance with predetermined operational variables, said control mechanism being operable to reduce the fluid pressure in said fluid distribution circuit to zero when the transmission system is in a neutral condition and to gradually increase the fluid pressure when the transmission is driven from the neutral condition by said driving member.

8. A hydrostatic power transmission system according oppose claim 7, in which said fluid distribution circuit is formed with radial ports which are formed in each of the cylinder blocks of said constant and variable fluid displacement units and merging respectively from the cylindrical chambers in each cylinder block, said radial ports being opened toward said driven member, an axial bore formed in said driven shaft and axially extending substantially coextensively with the constant and variable fluid displacement units, a semi-circumferential groove formed in the outer peripheral wall of said driven of substantially member and substantially coextensive with the radial ports in the cylinder block of said constant fluid displacement unit, said semi-circumferential groove being in communication with said axial bore in said driven member, an elongate groove formed in the outer peripheral wall of said driven member and having one end substantially coextensive with the radial ports in the cylindrical block of said constant fluid displacement unit and the other end close to the cylinder block of said variable fluid displacement unit, said semi-circumferential groove and said elongate groove being diametrically opposed to each other through an axis of said driven member, a sleeve held stationary between said driven member and the cylinder block of said variable fluid displacement unit, a pair of substantially diametrically opposed semi-circumferential grooves formed in an outer peripheral wall of said sleeve and substantially coextensive with the radial ports in the cylinder block of said variable fluid displacement units, two elongated grooves formed in the outer peripheral wall of said sleeve and adjoining with said diametrically opposed semi-circumferential grooves respectively, a pair of spaced annular grooves formed in the outer peripheral wall of said driven member adjacent said sleeve, one of said annular grooves communicating with one of said elongated grooves in said sleeve and with said axial bore in the driven member and the other communicating with one of said semi-circumferential grooves in said sleeve and with said elongate groove in said driven member, and fluid supply passages leading from a source of a pressurized fluid and communicating respectively with said elongate grooves in said sleeve.

9. A hydrostatic power transmission system according to claim 8, further comprising a fluid shut-off arrangement which includes a fluid shut-off valve member axially slidably accommodated within an extension of said axial bore in said driven member, said extension consisting of a smaller-diameter bore merging from said axial bore and a larger diameter bore next to said smaller-diameter bore, said valve member having a plunger portion extending throughout said smaller diameter bore and having its leading end projecting into said axial bore adjacent the annular groove communicating with said axial bore and a flange portion formed at the opposite end of said plunger portion and slidably received in said larger-diameter bore, the flange portion thus defining a fluid chamber in said larger-diameter bore, said valve member having formed therein a fluid passage axially extending from one end of the valve member to the other for providing fluid communication between said axial bore and said fluid chamber, resilient biasing means mounted in said extension for biasing said valve member away from said axial bore, a fluid line leading from said smaller-diameter bore through a port formed in said driven member, and a control valve unit communicating with said fluid distribution circuit and said fluid line and responsive to direct-drive condition of said transmission system, said control valve unit being operable to provide fluid communication between said fluid distribution circuit and said fluid line during conditions excepting said direct-drive condition and blocking said communication and providing fluid communication between said fluid line and a drain port during the direct-dirve condition for relieving the fluid pressure acting upon said flange portion to oppose the fluid pressure in said fluid chamber so that the fluid shut-off valve member is moved against the action of said resilient biasing means to a position to block the fluid communication between said axial bore and the corresponding annular groove in said driven member to interrupt the fluid path leading from said constant fluid displacement unit to the variable fluid displacement unit during the direct-drive condition.

10. A hydrostatic power transmission system according to claim 9, in which said control valve unit comprises a spool valve including a spool axially slidably received within a bore in a valve housing and having spaced lands with substantially equal working areas, said lands defining an annular groove therebetween, resilient biasing means biasing said spool valve in one direction in which said fluid communication between said fluid distribution circuit and said fluid line is established through said annular groove between said lands and in which said drain port is closed by one of said lands, and means responsive to said direct-driven condition and including an actuating rod bearing against the other of said lands and moved in a direction opposite to said one direction against the action of said resilient biasing means of the control valve unit for blocking said fluid communication between said fluid distribution circuit and said fluid line by said other of the lands and providing fluid communication between said fluid line and said drain port through said annular groove in said spool valve to drain off the fluid in said fluid line.

* * * * *